United States Patent [19]
Hobart

[11] Patent Number: 5,283,728
[45] Date of Patent: Feb. 1, 1994

[54] VARIABLE TRANSFORMER WITH SLIDABLE CONTACTOR

[76] Inventor: Edward J. Hobart, 2155 E. Rusk Rd., Troy, Ohio 45373

[21] Appl. No.: 961,348

[22] Filed: Oct. 15, 1992

[51] Int. Cl.$^5$ .......................... H02M 7/06; G05F 1/14
[52] U.S. Cl. ..................... 363/100; 323/340; 336/138; 336/149; 363/126
[58] Field of Search ................ 363/100, 126; 336/138, 336/149; 323/340, 341, 255, 256; G05F 1/14

[56] References Cited

U.S. PATENT DOCUMENTS

| | | | |
|---|---|---|---|
| 920,925 | 5/1909 | Darlington | 336/149 |
| 2,273,245 | 2/1942 | Ander | 336/149 |
| 2,859,398 | 11/1958 | Johnson et al. | 336/149 |
| 3,346,804 | 10/1967 | Ryu | 336/138 |

FOREIGN PATENT DOCUMENTS

| | | | |
|---|---|---|---|
| 1098603 | 2/1961 | Fed. Rep. of Germany | 336/149 |
| 1184003 | 12/1964 | Fed. Rep. of Germany | 323/341 |

Primary Examiner—William H. Beha, Jr.
Attorney, Agent, or Firm—William Weigl

[57] ABSTRACT

A voltage control system has a pair of clockwise and counterclockwise interleaved coils on a portion of a transformer core, the coils having multiple spaced turns providing sets of co-planar alternate electrical contact pairs extending linearly to form a tapping system for varying the output voltage of the transformer. A conductive electrical bridging member is movable in the linear direction of extension of the contacts and bridges a selected pair of contacts, one contact from each coil, to alter the effective number of electrical turns of the two coils between a minimum and maximum output voltage. An adjunctive feature is to provide both a contact lead to the bridging member and appropriate rectification at output ends of the pair of coils in order to produce a direct current output.

13 Claims, 2 Drawing Sheets

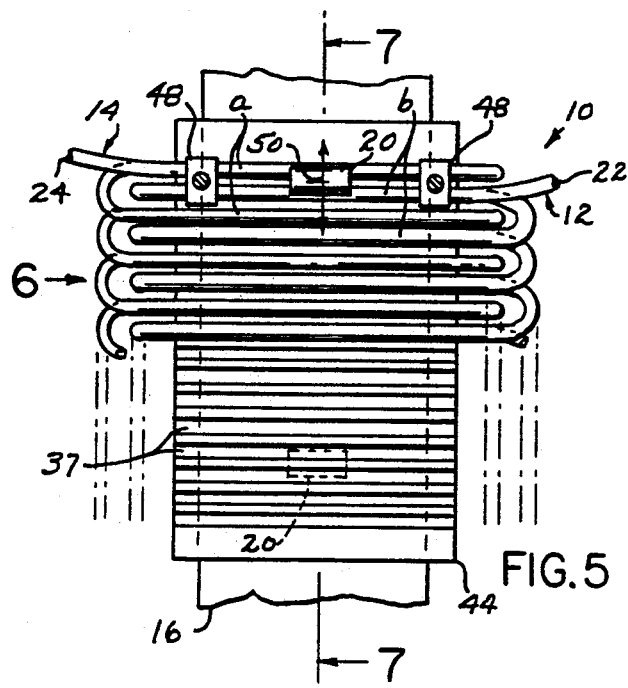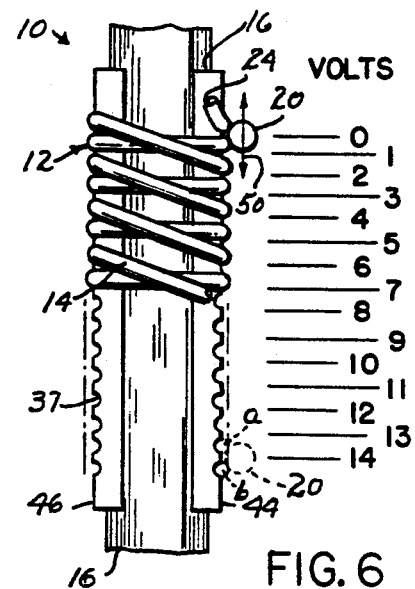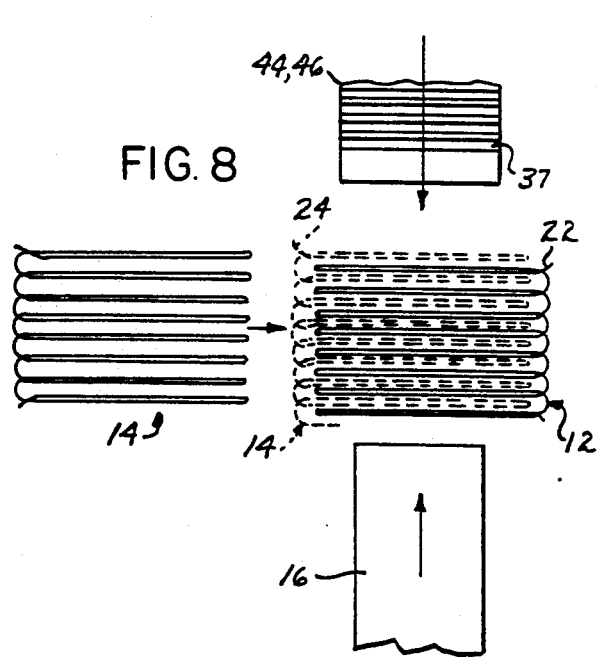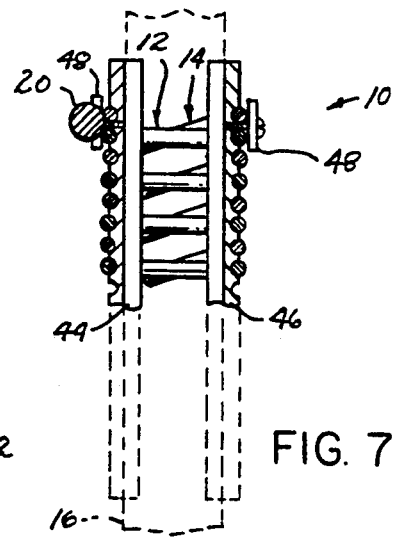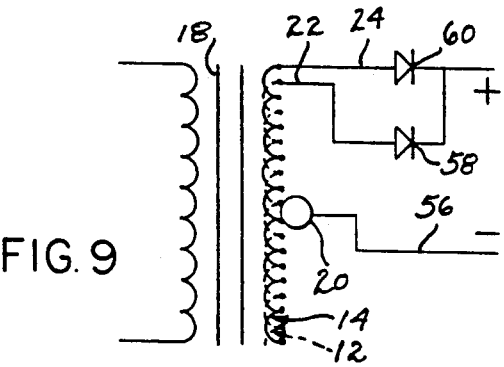

VARIABLE TRANSFORMER WITH SLIDABLE CONTACTOR

This invention relates to a system for varying the voltage and/or amperage output of an electrical input to effect the control of an electrically-operated device. It is described herein for convenience in connection with an alternating current transformer of welding equipment, and in particular with the secondary winding of such a transformer, where it would likely find its most advantageous potential.

BACKGROUND OF THE INVENTION

Several methods are commonly used for controlling the output voltage for welders and various other kinds of equipment requiring adjustable power supplies. Examples are the tapped transformer and range selector switch, and the sliding brush variable transformer. More recently, silicon controlled rectifiers (SCRs) and other electronic devices have come onto the scene as more sophisticated forms of controls. There remains room for improvement of the less sophisticated versions, however, not only for cost reduction, but also for ease of servicing and repairing where electronic service is not readily available.

The workhorse of the welding equipment industry has long been the manually-operated range selector switch at the terminal ends of conductor wires which lead from locations where they are physically tapped to the secondary winding of a transformer. The transformer, switch and other controls are typically located within a housing, and a range selector switch handle is on the housing for ease of reach and operation by the welder. The present invention is designed to eliminate the need for a separate range selector switch, its contacts and the leads tapped to the transformer secondary winding.

SUMMARY OF THE INVENTION

The invention relates to a voltage control system which has a pair of clockwise and counterclockwise wound interleaved coils on a portion of a transformer core. The coils have multiple spaced turns which provide sets of co-planar alternate electrical contact pairs extending linearly to form a tapping system for varying the output voltage of the transformer. A conductive jumper or bridging member is movable in the linear direction of extension of the contacts and electrically bridges a selected pair of contacts, one from each coil, to alter the effective number of electrical turns of the two coils, thereby enabling a range of voltage adjustment between a minimum and maximum output. In a variation of the invention, a contact member may be connected to the bridging member and two diodes connected to transformer output leads to produce a variable full-wave center-tapped transformer direct current power supply.

It is a principal object of my invention to replace the conventional range selector switch and associated wire leads of a voltage control system with simple contacts which are unitary with the winding of a transformer, and which electrically bridge a pair of oppositely-wound transformer coils to vary the effective number of electrical turns of the two coils.

Another object is to provide a unique shape to helically-wound clockwise and counterclockwise transformer coils to enable practice of a simple assembly technique for mounting the coils on the leg of a transformer core.

An ancillary object is to enable the structure of the invention to also provide a direct current output from the electrical bridge connecting the two coils.

A further object of the invention is to avoid the necessity of providing tapping leads and wires to certain parts of a selectively tapped transformer.

Other objects and advantages will become apparent from the following description, in which reference is made to the accompanying drawings.

BRIEF DESCRIPTION OF THE DRAWINGS

FIG. 5 is a front elevational view illustrating the relationship of clockwise and counterclockwise coils interleaved to provide alternate contacting surfaces for enabling a conducting bridging roller to vary the voltage as it may be moved vertically between a minimum output position shown in full lines and a maximum output shown in dotted lines.

FIG. 6 is a side elevational view taken looking to the right substantially in the direction of arrow 6 in FIG. 5.

FIG. 7 is a vertical cross-sectional view of the structure of FIG. 5 taken essentially along lines 7—7.

FIG. 8 illustrates a preferred method of assembling the coils of FIG. 5 onto a transformer core.

FIG. 9 is a schematic wiring diagram similar to FIG. 4, and includes means for producing a direct current variable output voltage from a variation of the invention which incorporates two diodes and a contact lead from the bridging member to make a full-wave center-tapped transformer power supply.

DESCRIPTION OF THE PREFERRED EMBODIMENT

Figure 1:
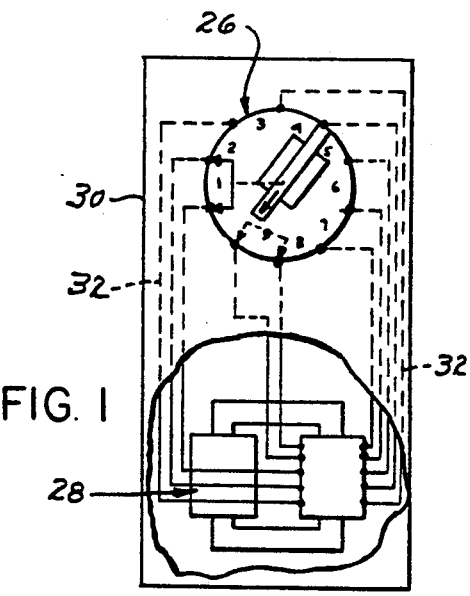
FIG. 1 is a simplified depiction of a common prior art device which includes a housing with an AC transformer therein and tapped leads extending between the transformer secondary winding and a range selector switch.

A voltage control system 10 has clockwise and counterclockwise interleaved coils 12 and 14, respectively, on a portion or leg 16 of a transformer core 18, the coils having multiple spaced turns providing sets of essentially co-planar alternate electrical contact pairs a-b and b-a extending linearly to form a tapping system for varying the output voltage of the transformer. An electrically conductive jumper or bridging member preferably in the form of a roller 20 is movable in the linear direction of extension of the contacts and bridges a selected pair of contacts "a" and "b", one contact from each coil, to alter the effective number of electrical turns of the two coils between a minimum and maximum output voltage. The output ends of the coils 12 and 14 are shown by the numerals 22 and 24 in several views of the drawings, it being understood that the output ends 22 and 24 may be connected either to the end device the voltage of which is being controlled, or to another portion of the system. Coils 12 and 14 serve a dual function of generating voltages in a normal transformer fashion while also serving as switch contacts. It is also to be understood that while I illustrate my invention in connection with a secondary winding of a transformer, it is capable of also being used in the primary winding. It is also feasible to use the principles disclosed herein in systems other than transformers, such, for example, as alternating current variable inductors, direct current variable inductors and transformer tap changing systems.

FIG. 1 illustrates a prior art rotary range selector switch 26 for controlling the output from a transformer 28 mounted within a housing 30. This type of unit has been in long use in the welding equipment industry. By rotating the switch in a clockwise direction from its solid-line position to the end position of the switch where the switch pointer is shown in dotted lines, nine different output voltages can be obtained. This can be seen from the existence of ten wire conductors 32 which are physically tapped to the secondary windings of the transformer and lead to contacts associated with the range selector switch 26 interiorly of the housing 30.

Figure 2:
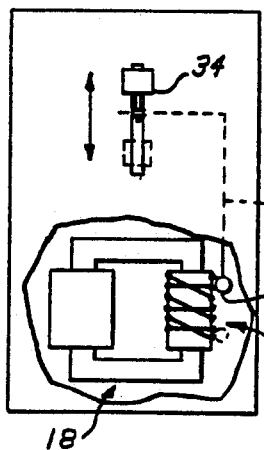
FIG. 2 is a simplified depiction of the present invention embodied in a housing similar to the housing of FIG. 1, wherein the controls for varying the output voltage are operated from the exterior of the housing by a manually-movable lever.

The broadest aspect of the improvement of the present invention can be seen by comparing the structure of FIG. 2 with the prior art range switch unit of FIG. 1. In FIG. 2, there are no leads or conductors comparable to the prior art conductors 32 of FIG. 1, nor any need to physically tap the secondary of the transformer with any fixed leads. Additionally, the handle of range selector switch 26 is replaced by a simple lever and link system including a vertically movable handle 34. Handle 34 is connected to the roller 20 by means of a connecting link or rod 36 and a track means (not shown) for guiding the roller up and down in response to vertical movement of the handle 34. It will become apparent that any means can be used for translating roller 20 in relation to the coils 12 and 14, including a remotely controlled motorized arrangement. Nevertheless, the switching in my system is accomplished directly at the coils themselves, and is not done by a remote switch such as range selector switch 26 which requires the extension of wire leads from the coils to the switch. By embodying my switching system directly and unitarily with the coils, the cost and complexity of the unit can be greatly reduced. What had formerly been done by many physical parts and with much labor to construct is now capable of being done with fewer and more easily constructed parts.

Referring now to the construction of the coils and the voltage varying operation, the transformer core 18 is provided with a primary winding 38 having leads 40 and 42 connected to a conventional source of alternating current. The core 18 of the transformer may also be conventional and provided with separate core portions supporting the primary and secondary windings. Core portion 16 supports the coils 12 and 14 on a pair of insulating plates 44 and 46. The plates are widely vertically grooved on the sides facing the core 16 to snuggly fit the core portion 16. The outwardly facing sides of the plates 44 and 46 are horizontally grooved as at 37 to receive the wire turns of the coils and firmly support them, in particular, the side of the coils engaged by the roller 20 during its traversing of the contacts "a" and "b". Several clamping plates 48 are fastened at selected locations about the unit to tightly hold the wires of the coils 12 and 14 in place. The wire gauge of the illustrated version of my invention shown is #4, but any gauge is feasible, providing the wire can be properly supported to firmly seat the contacts "a" and "b" during relative movement of the roller 20 thereover. While I have illustrated a roller-type bridging member 20 and wire which is round in cross-section, their cross-sectional shapes can be any configuration suitable to provide good electrical contact surfaces.

Figure 3:
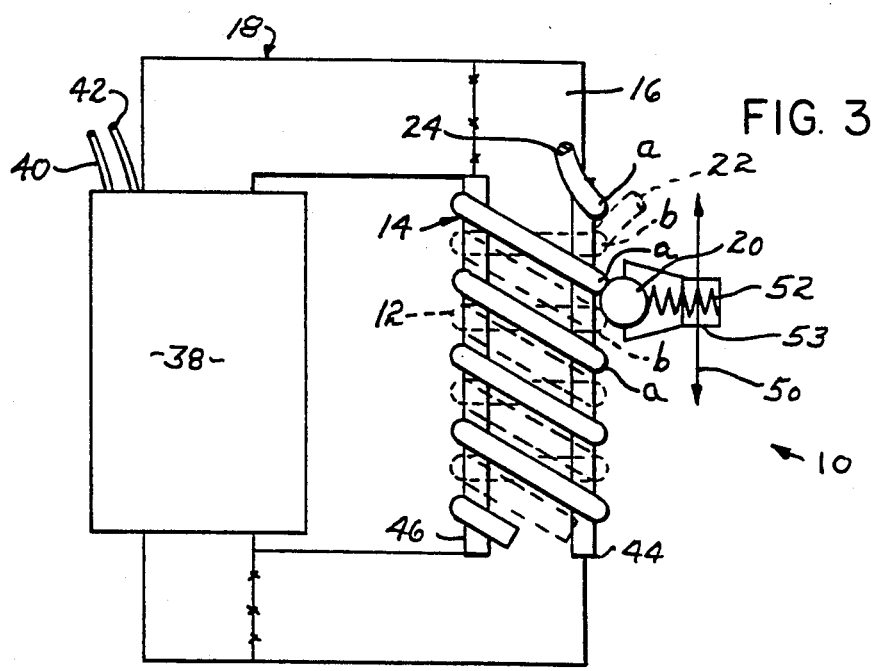
FIG. 3 is a side elevational view of an AC transformer with the windings of the unit being greatly enlarged and fewer in number to illustrate the principles of operation of a device made according to the invention. One of the coils in this Figure is shown in dotted lines to distinguish it from the other coil.

Because of the particular manner in which the plates 44 and 46 support the coils, the wires of the coils need not be provided with an insulating coating. If coated wire is used, however, the contact surfaces "a" and "b" should be stripped of the coating, at least where the roller 20 comes in contact with them. The roller 20 is movable in the direction of the arrow 50 along a track means (not shown) integral with the transformer. No particular means of mounting the roller for movement or for supporting the roller 20 have been shown, since a variety of mounting means designs will be obvious to persons skilled in the electrical arts. In order to provide firm electrical contact between the roller 20 and contact surfaces "a" and "b", a compression spring 52 (FIG. 3) may be provided to give good line contact between the roller and the contacts "a" and "b". This line contact is sometimes referred to herein as surface contact. The diameter of the roller should be related to the wire diameter to provide as good a contacting surface as is needed. Obviously, roller 20 is insulated from its mounting means, which means is simply shown by the numeral 53 in FIG. 3.

Figure 4:
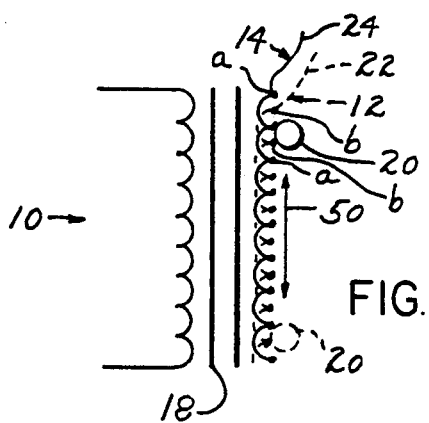
FIG. 4 is a schematic wiring diagram of a transformer embodying the invention, and is intended to show in simplified fashion what occurs in the form of the invention shown in FIG. 3.

The utilization of the separate clockwise and counter-clockwise coils 12 and 14 to vary the voltage is not without design and construction difficulty. In the illustrated example, I select to vary the voltage by one volt per coil turn. As seen at the right of FIG. 6, the range of voltage output variation is from 0–14 volts when the roller 20 is moved between its upper, full-line minimum output position and its maximum output position at the last, dotted-line lowermost position. A schematic illustration of this occurrence can be seen in FIG. 4, where the coils are connected in series by the bridging member 20. With the roller contacting the second set of "a" and "b" contacts, the effective number of electrical turns of the secondary winding is the sum of the turns through those contacts and between the output ends 22 and 24 of the two coils 12 and 14. If the roller were moved to its next lower position, it would bridge contacts "b" and "a" of the next pair in the linear set of contacts. To be most effective, I prefer that the contact surfaces of "a" and "b" be parallel and evenly spaced perpendicular to the direction of extension of the core portion 16 through the coils. To accomplish this, let us proceed to a discussion of FIG. 8, where the preferred form of coils and their preferred assembly to the unit are described.

FIG. 8 includes the principal elements of my improved system, namely, the two oppositely wound coils 12 and 14, the supporting insulating plates 44, 46 and the core portion 16 on which the coils and plates are to be mounted. In simplified fashion, I illustrate coil 14 as being wound generally helically, but in an out-of-the-ordinary manner. At the left side of coil 14, angled portions are vertically aligned along that left edge, while the entire rest of each coil turn is essentially in the same horizontal plane. It can be seen in FIG. 6, for example, that the ends of coil 12 are horizontal, as are the sides of the same turn where they are located in grooves 37 in the plates 44 and 46. Coil 14 is wound counterclockwise as viewed from above, with its angled helical portions occupying the left edge of the coil. Coil 12, on the other hand, is wound clockwise as viewed from above, with its angled helical portions occupying the right edge of the coil. By properly spacing the turns of the two coils, they can be interleaved as shown at the right side of FIG. 8, by moving coil 14 relatively toward coil 12 until coil 14 reaches the dotted-line position of FIG. 8. Once this has been accomplished, the plates 44 and 46 can be inserted into a common central opening of the combined coils, one at a time, and selected coil turns then fastened thereto by the clamping plates 48. It may be feasible to use but a single plate 44, since only one side of the coil turns is contacted by the roller 20.

After the coils and plates 44 and 46 are connected, the leg or portion 16 of the core of the transformer can then be inserted into the wide longitudinal grooves at the inner sides of the insulating plates and welded or otherwise affixed to the other leg of the core. This method of assembly enables the coils to be separately wound off the transformer and interleaved in the fashion shown.

Since a heavy wire gauge is required in order to have solid electrical contact between the roller 20 and the contacts "a" and "b", ease of manufacturing the coils is of importance. To this end, the coils are preferably of relatively ductile copper, and have been hand-wound over a two-part forming tool having grooves similar to those in plates 44 and 46. After winding, a wedging member was used to force the forming tool parts outwardly until the actual end size of a coil was achieved. This made the portions of the coils which eventually became contacts "a" and "b" straight and parallel. It also made the outer portions over which roller 20 rides essentially co-planar. Obviously, a variety of different types of coil-making tools and equipment can be designed by persons skilled in the art. If the coil wire is coated with insulation at the time of winding, their outer parallel surfaces which become contacts "a" and "b" must be stripped of coating either before or after assembly with the transformer.

FIG. 9 illustrates the potential my invention has for also improving the circuitry and number of electrical components required to produce a D. C. variable voltage output. By providing a contact lead 56 from bridging roller 20 and placing a pair of diodes 58 and 60 in output ends 22 and 24 respectively of coils 12 and 14, the number of diodes required for full wave rectification is reduced from the standard number of four to two. In effect, the center-tapped transformer configuration reduces the number of diodes for full wave rectification.

Various other changes may be made in the details of construction or use to which the principles may be put without departing from the spirit and scope of my invention.

Having described my invention, I claim:

1. In a voltage control system for an alternating current power supply;
    a core having an elongated coil-supporting portion electromagnetically connected to said power supply;
    a first electrically-conducting coil having multiple spaced clockwise turns evenly wound about and extending essentially helically lengthwise of said elongated coil-supporting portion;
    a second electrically-conducting coil having multiple spaced counter-clockwise turns evenly wound about and extending essentially helically lengthwise of said elongated portion for essentially the same effective length as said first coil, with at least a portion of each turn of said second coil being alternately interleaved with a portion of each turn of said first coil;
    means insulating said coils from each other and from said elongated coil-supporting portion;
    said portions of each of said turns of said coils being uninsulated at least on their outermost sides and said turn portions extending perpendicularly to said elongated coil-supporting portion where said coils are interleaved, all of said outermost sides of the turns of both coils being located in a common linear plane extending parallel to said elongated coil-supporting portion to provide a linear set of electrical contacting surfaces, and said outermost sides providing adjacent spaced pairs of such electrical contact surfaces;
    an electrically-conducting bridging member for simultaneously contacting and electrically bridging a selected pair of said contact surfaces, one from said first coil and the other from said second coil whereby to provide a first effective number of electrical turns of said combined coils to provide a first voltage output therefrom;
    means mounting said bridging member for movement along a fixed path parallel to said linear set of contacting surfaces whereby said bridging member can bridge other selected adjacent pairs of contact surfaces to provide a different effective number of electrical turns of said combined coils and different output voltages therefrom; and,
    means supporting said bridging member for firm electrical contact with said contact surfaces when said bridging member is moved along said set.

2. The invention according to claim 1 wherein said coils are uninsulated throughout their lengths.

3. The invention according to claim 1 wherein said coils are provided with an insulating coating and wherein said coating is stripped from said coils at said contact surfaces.

4. The invention according to claim 1 wherein said first and second coils form the secondary winding of an alternating current transformer.

5. The invention according to claim 1 wherein the majority of the helix of said each turn of both coils is essentially in a single plane perpendicular to the extension of the coil and has an angled portion along one edge thereof, all of said angled portions being aligned lengthwise of each coil to provide space between adjacent coil turns to enable corresponding planar portions of the turns of the other coil to be interleaved by lateral insertion of the coils turns toward each other.

6. The invention according to claim 1 wherein said insulating means comprises at least one plate having grooves for receiving and firmly supporting at least said set of electrical contact surfaces.

7. The invention according to claim 5 wherein said insulating means comprises a pair of spaced plates on opposite sides of said core, each said plate having grooves for receiving and firmly supporting planar portions of each coil turn.

8. The invention according to claim 7 further including means for fastening selected ones of said coil turns to said plates.

9. The invention according to claim 1 wherein said mounting means for said bridging member is integrally mounted with and thereby unitary with said core.

10. The invention according to claim 1 wherein the turns of said coils and said bridging member are round in cross-section.

11. The invention according to claim 10 wherein said bridging member is spring-biased toward said coils to maintain firm electrical electrical contact between said bridging member and the selected pairs of contact surfaces.

12. The invention according to claim 1 wherein a housing is provided for containing said voltage control system therein, and wherein said means mounting said bridging member for movement comprises a manually operated lever at the exterior of said housing and means interconnecting said lever to said bridging member for corresponding movement thereof along said set of electrical contact surfaces.

13. The invention according to claim 1 wherein a contact lead is electrically connected to said bridging member, wherein output ends of said coils are each provided with a diode and said output ends are electrically connected downstream of said diodes, thereby providing a variable voltage direct current output from a variable center-tapped transformer.

* * * * *